(12) United States Patent
Lee et al.

(10) Patent No.: US 9,537,134 B2
(45) Date of Patent: Jan. 3, 2017

(54) RECHARGEABLE BATTERY

(71) Applicant: SAMSUNG SDI CO., LTD., Yongin-si, Gyeonggi-do (KR)

(72) Inventors: Hong-Hyeon Lee, Yongin-si (KR); Sang-Won Byun, Yongin-si (KR); Jeong-Wan Haam, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 442 days.

(21) Appl. No.: 14/039,475

(22) Filed: Sep. 27, 2013

(65) Prior Publication Data

US 2014/0315076 A1    Oct. 23, 2014

(30) Foreign Application Priority Data

Apr. 17, 2013 (KR) .................. 10-2013-0042362

(51) Int. Cl.
  *H01M 2/22* (2006.01)
  *H01M 2/26* (2006.01)
  *H01M 2/30* (2006.01)

(52) U.S. Cl.
  CPC .............. *H01M 2/22* (2013.01); *H01M 2/266* (2013.01); *H01M 2/30* (2013.01)

(58) Field of Classification Search
  CPC ............. H01M 2/02; H01M 2/20; H01M 2/30
  See application file for complete search history.

(56) References Cited

U.S. PATENT DOCUMENTS

| 2008/0107961 A1* | 5/2008 | Jeong | H01M 2/206 429/163 |
| 2010/0266894 A1 | 10/2010 | Byun et al. | |
| 2011/0136000 A1* | 6/2011 | Moon | H01M 2/0285 429/163 |
| 2011/0183193 A1 | 7/2011 | Byun et al. | |
| 2011/0195288 A1* | 8/2011 | Harima | H01M 10/0431 429/94 |

FOREIGN PATENT DOCUMENTS

KR    10-2010-0115983 A    10/2010
KR       10-1042808 B1     6/2011

* cited by examiner

*Primary Examiner* — Barbara Gilliam
*Assistant Examiner* — Nathanael Zemui
(74) *Attorney, Agent, or Firm* — Lee & Morse, P.C.

(57) ABSTRACT

A rechargeable battery includes an electrode assembly for performing charging and discharging operations, a case accommodating the electrode assembly, a cap plate coupled to an opening of the case, an electrode terminal installed on the cap plate, and a lead tab connecting the electrode assembly to the electrode terminal, the lead tab including a terminal connection part connected to the electrode terminal, and a current-collecting connection part connected to the electrode assembly, the current-collecting connection part including a welding portion connected to the electrode assembly, and an absorption portion separated from the welding portion in a first direction parallel to the cap plate and provided on an outer side of the welding portion.

6 Claims, 10 Drawing Sheets

(a)          (b)

(a)  (b)

RECHARGEABLE BATTERY

CROSS-REFERENCE TO RELATED APPLICATION

The present application claims priority under 35 U.S.C. §119 to Korean Patent Application No. 10-2013-0042362, filed on Apr. 17, 2013, in the Korean Intellectual Property Office, and entitled: "Rechargeable Battery," which is incorporated by reference herein in its entirety.

BACKGROUND

1. Field

Embodiments relate to a rechargeable battery.

2. Description of the Related Art

A rechargeable battery is a battery that may be repeatedly charged and discharged, unlike a primary battery. A low-capacity rechargeable battery is used for small portable electronic devices such as a mobile phone, a notebook computer, and a camcorder, and a large-capacity rechargeable battery is used as a power supply for driving a motor such as a hybrid car.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery, including an electrode assembly for performing charging and discharging operations, a case accommodating the electrode assembly, a cap plate coupled to an opening of the case, an electrode terminal installed on the cap plate, and a lead tab connecting the electrode assembly to the electrode terminal, the lead tab including a terminal connection part connected to the electrode terminal, and a current-collecting connection part connected to the electrode assembly, the current-collecting connection part including a welding portion connected to the electrode assembly, and an absorption portion separated from the welding portion in a first direction parallel to the cap plate and provided on an outer side of the welding portion.

The welding portion may be welded to an uncoated region of the electrode assembly, and the absorption portion may be spaced apart from the welding portion by a slot hole formed along a length of the current-collecting connection part between the absorption portion and the welding portion.

The slot hole may be formed in a straight line along the length of the current-collecting connection part.

The current-collecting connection part may have a first width defined in the first direction, the welding portion and the absorption portion may have a second width and a third width, respectively, both of which are less than the first width, and the second width may be greater than the third width.

The slot hole may be formed in a curved line along the length of the current-collecting connection part.

The welding portion may be welded to an uncoated region of the electrode assembly, and the absorption portion may be separated from the welding portion by a line formed through the current-collecting connection part along a length of the current-collecting connection part.

The line may be formed in a straight line along the length of the current-collecting connection part, and provided in a plurality of lines parallel to each other.

BRIEF DESCRIPTION OF THE DRAWINGS

Features will become apparent to those of skill in the art by describing in detail example embodiments with reference to the attached drawings in which.

DETAILED DESCRIPTION

Figure 1:
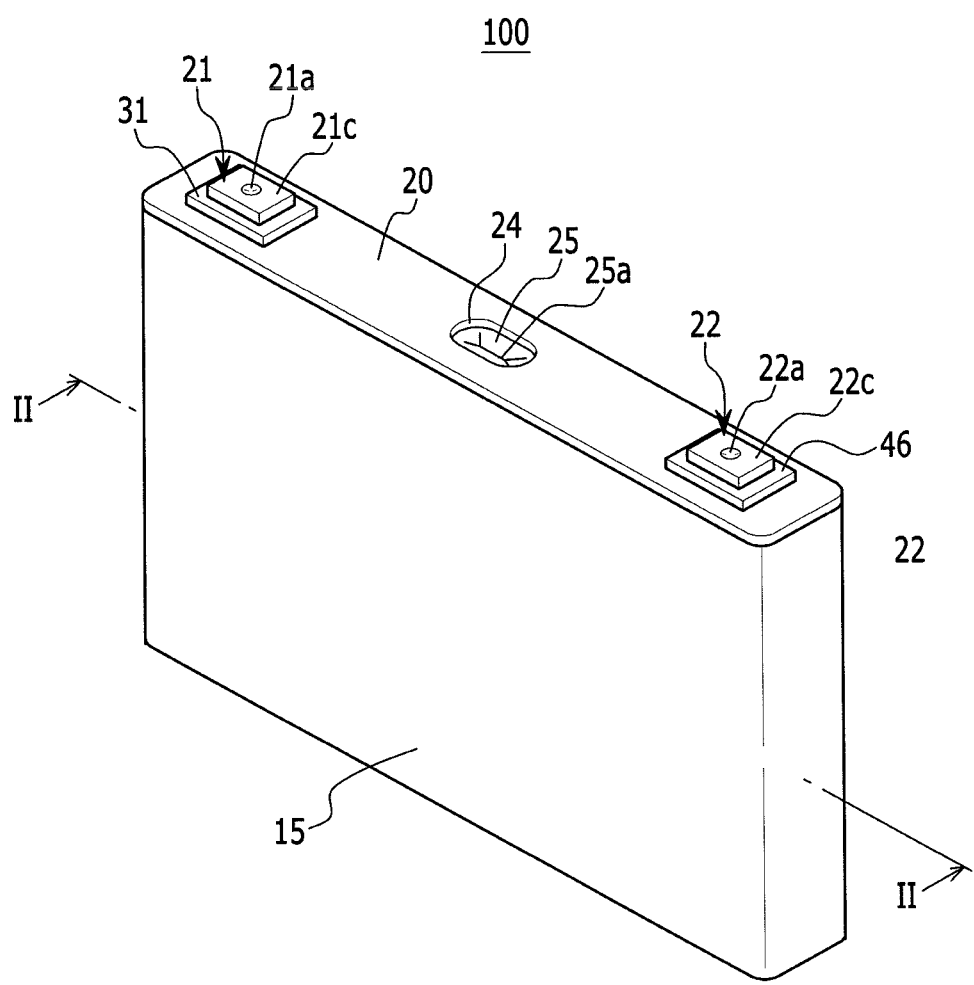
FIG. 1 illustrates a perspective view of a rechargeable battery in accordance with a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

Figure 2:
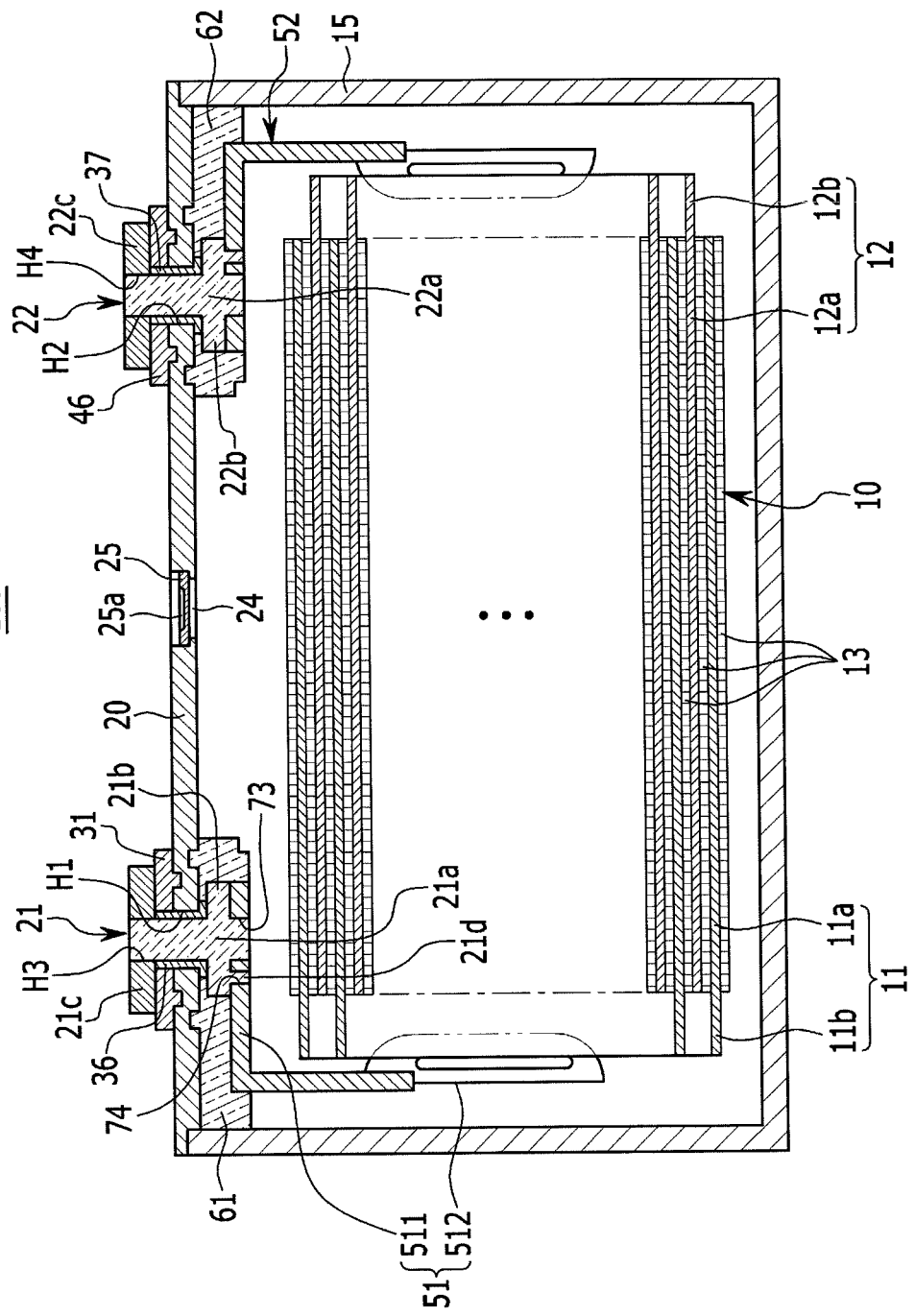
FIG. 2 illustrates a cross-sectional view taken along line II-II of FIG. 1.

FIG. 1 illustrates a perspective view of a rechargeable battery in accordance with a first example embodiment. FIG. 2 illustrates a cross-sectional view taken along line II-II of FIG. 1.

Referring to FIG. 1 and FIG. 2, a rechargeable battery in accordance with an example embodiment includes an electrode assembly for performing charging and discharging operations, a case 15 accommodating the electrode assembly 10, a cap plate 20 coupled to an opening of the case 15, electrode terminals 21 and 22 installed on the cap plate 20, and lead tabs 51 and 52 connecting the electrode terminals 21 and 22 to the electrode assembly 10.

For example, the electrode assembly 10 may be formed by disposing electrodes (e.g., a negative electrode 11 and a positive electrode 12) on both surfaces of the separator 13, which is an insulator, and winding the negative electrode 11, the separator 13, and the positive electrode 12 in a jelly-roll shape.

The negative and positive electrodes 11 and 12 include coated regions 11a and 12a, formed by applying an active material to a current collector of a metal plate, and uncoated regions 11b and 12b, which are exposed portions of the current collector to which the active material is not applied.

The uncoated region 11b of the negative electrode 11 is formed at one end of the negative electrode 11 along the wound negative electrode 11. The uncoated region 12b of the positive electrode 12 is formed at one end of the positive electrode 12 along the wound positive electrode 12. The uncoated regions 11b and 12b are respectively disposed at opposite ends of the electrode assembly 10.

The case 15 may have a prismatic or approximately cuboid shape so that an internal space for housing the electrode assembly 10 may be defined. An opening for connecting external and internal spaces may be formed on one side of the cuboid. The electrode assembly 10 is inserted into the case 15 through the opening.

The cap plate 20 is installed in the opening of the case 15 to close and seal the case 15. For example, the case 15 and the cap plate 20 may be formed of aluminum and welded to each other. Thus, after the electrode assembly 10 is inserted into the case 15, the cap plate 20 may be welded to the opening of the case 15.

The cap plate 20 has at least one opening, for example, terminal holes H1 and H2 and a vent hole 24. The electrode terminals 21 and 22 are respectively installed in the terminal holes H1 and H2 of the cap plate 20, and electrically connected to the electrode assembly 10.

Thus, the electrode terminals 21 and 22 are electrically connected to the negative electrode 11 and positive electrode 12 of the electrode assembly 10, respectively. Accordingly, the electrode assembly 10 may be drawn out of the case 15 through the electrode terminals 21 and 22.

The electrode terminals 21 and 22 include plate terminals 21c and 22c provided on the outside of the cap plate 20, corresponding to the terminal holes H1 and H2, and rivet terminals 21a and 22a electrically connected to the electrode assembly 10, and fastened to the plate terminals 21c and 22c through the terminals holes H1 and H2.

The plate terminals 21c and 22c have through holes H3 and H4. The rivet terminals 21a and 22a penetrate from the top into the through holes H3 and H4 through the terminal holes H1 and H2. The electrode terminals 21 and 22 further include flanges 21b and 22b extended integrally with the rivet terminals 21a and 22a inside the cap plate 20.

At the electrode terminal 21 to be connected to the negative electrode 11, an external insulating member 31 is interposed between the plate terminal 21c and the cap plate 20, thus electrically insulating the plate terminal 21c from the cap plate 20. Thus, the cap plate 20 remains electrically insulated from the electrode assembly 10 and the negative electrode 11.

The insulating member 31 and the plate terminal 21c are fastened to the upper end of the rivet terminal 21a by coupling the insulating member 31 and the plate terminal 21c to the upper end of the rivet terminal 21a and riveting or welding the upper end. The plate terminal 21c is installed at the outside of the cap plate 20, with the insulating member 31 interposed between them.

At the electrode terminal 22 to be connected to the positive electrode 12, a conductive top plate 46 is interposed between the plate terminal 22c and the cap plate 20, thus electrically connecting the plate terminal 22c with the cap plate 20. Thus, the cap plate 20 is electrically connected from the positive terminal 22.

The top plate 46 and the plate terminal 22c are fastened to the upper end of the rivet terminal 22a by coupling the top plate 46 and the plate terminal 22c to the upper end of the rivet terminal 22a and riveting or welding the upper end. The plate terminal 22c is installed at the outside of the cap plate 20, with the top plate 46 interposed between them.

Gaskets 36 and 37 are disposed between the rivet terminals 21a and 22a of the electrode terminals 21 and 22 and the inner surfaces of the terminal holes H1 and H2 of the cap plate 20, to seal and electrically insulate between the rivet terminals 21a and 22a and the cap plate 20.

The gaskets 36 and 37 are more extendedly mounted between the flanges 21b and 22b and the inner surface of the cap plate 20 to better seal and electrically insulate between the flanges 21b and 22b and the cap plate 20. The gaskets 36 and 37 allow the electrode terminals 21 and 22 to be installed on the cap plate 20 without the electrolyte from being leaked through the terminal holes H1 and H2.

The lead tabs 51 and 52 electrically connect the electrode terminals 21 and 22 to the negative and positive electrodes 11 and 12 of the electrode assembly 10. Thus, the lead tabs 51 and 52 are connected to the lower ends of the rivet terminals 21a and 22a while being supported by the flanges 21b and 22b. The lead tabs 51 and 52 may be coupled to the lower ends of the rivet terminals 21a and 22a by, e.g., caulking the lower ends of the rivet terminals 21a and 22a.

Insulating members 61 and 62 are installed between the lead tabs 51 and 52 and the cap plate 20 to electrically insulate the lead tabs 51 and 52 from the cap plate 20. In addition, one side of each of the insulating members 61 and 62 is coupled to the cap plate 20 and the other side thereof surrounds the lead tabs 51 and 52, the rivet terminals 21a and 22a, and the flanges 21b and 22b, thereby stabilizing the connection structure thereof.

The vent hole 24 is closed and sealed with a vent plate 25 so as to discharge an internal pressure of the rechargeable battery and gases generated in the rechargeable battery. When the internal pressure of the rechargeable battery reaches a predetermined value, the vent plate 25 is ruptured to open the vent hole 24. The vent plate 25 has a notch 25a for inducing the rupturing.

Figure 3:
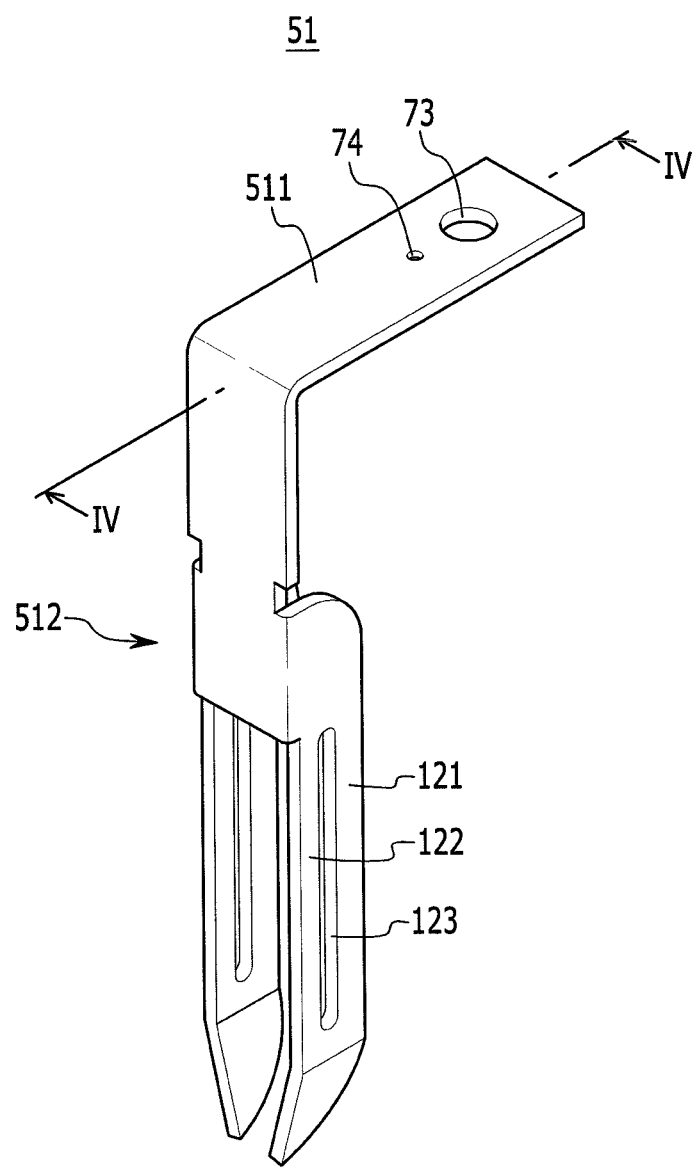
FIG. 3 illustrates a perspective view of the lead tab of FIG. 2.
Figure 4:
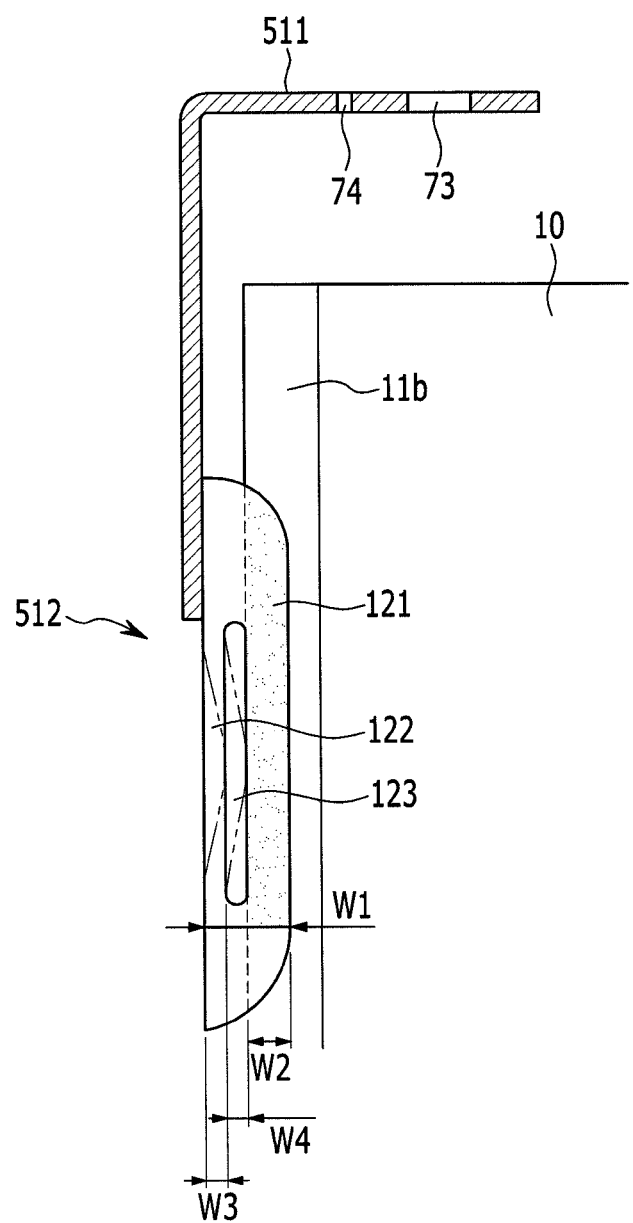
FIG. 4 illustrates a cross-sectional view taken along line IV-IV of FIG. 3.

FIG. 3 illustrates a perspective view of the lead tab of FIG. 2. FIG. 4 illustrates a cross-sectional view taken along line IV-IV of FIG. 3. The lead tabs 51 and 52 may be formed in the same manner, so a description of them will be given below with respect to the lead tab 51 to be connected to the negative electrode 11 of the electrode assembly 10, for convenience.

Referring to FIG. 2 to FIG. 4, the lead tab 51 includes a terminal connection part 511 connected to the rivet terminal 21a of the electrode assembly 10 and a current-collecting connection part 512 connected to the uncoated region 11b of the negative electrode 11 of the electrode assembly 10.

In the present example embodiment, the terminal connection part 512 includes pass-through slots 73 and 74. The terminal connection part 511 may be connected to the lower ends of the rivet terminals 21a and 22a and a protrusion 21d while being supported by the flanges 21b and 22b, by coupling the lower ends of the rivet terminals 21a and 22a and the protrusion 21d to the pass-through slots 73 and 74 to caulk the lower ends thereof.

The current-collecting connection part 512 includes a welding portion 121 to be connected to the electrode assembly 10 and an absorption portion 122 separated from the welding portion 121 in a direction intersecting the electrode terminal 21 (i.e., in the direction indicated by the line IV-IV) and provided on the outer side of the welding portion 121.

Thus, as shown in FIGS. 2 and 3, if the electrode terminal 21 is disposed in a vertical direction, the welding portion 121 and the absorption portion 122 are disposed at the right and left. Also, the welding portion 121 is disposed close to the negative electrode 11 of the electrode assembly 10, and the absorption portion 122 is disposed at a distance from the negative electrode 11 of the electrode assembly 10, compared to the welding portion 121.

For example, the welding portion 121 may be ultrasonically welded or laser-welded to the uncoated region 11b of the negative electrode 11 of the electrode assembly 10. The absorption portion 122 is spaced apart from the welding portion 121, with a slot hole 123 interposed between them.

In the present example embodiment, the slot hole 123 is formed along the length of the current-collecting connection part 512. Thus, the welding portion 121 and the absorption portion 122 are spaced apart from each other along the length of the current-collecting connection part 512, being close to and at a distance from the negative electrode 11 of the electrode assembly 10, respectively.

The slot hole 123 is formed in a straight line along the length of the current-collecting connection part 512. Accordingly, the welding portion 121 and the absorption portion 122 are spaced apart from each other along the slot hole 123, being close to and at a distance from the negative electrode 11, respectively.

The current-collecting connection part 512 has a first width W1 defined in a direction (lateral direction of FIG. 4—i.e., in the direction indicated by the line IV-IV of FIG. 3) intersecting the vertical direction of the electrode terminal 21, and the welding portion 121 and the absorption portion 122 have a second width W2 and a third width W3, respectively, both of which are less than the first width W1.

In the present example embodiment, the second width W2 is greater than the third width W3. The second width W2 helps contribute to obtaining a sufficient welding area of the uncoated region 11b of the negative electrode 11 and the welding portion 121, thereby helping to ensure high weld strength and minimize current resistance.

The third width W3 helps the absorption portion 122 to be easily deformed while absorbing compression if the case 15 intrudes due to external compression. A fourth width W4 of the slot hole 123 provides space in which the absorption portion 122 may be deformed within the current-collecting connection part 512 without intruding into the electrode assembly 10.

Figure 5:
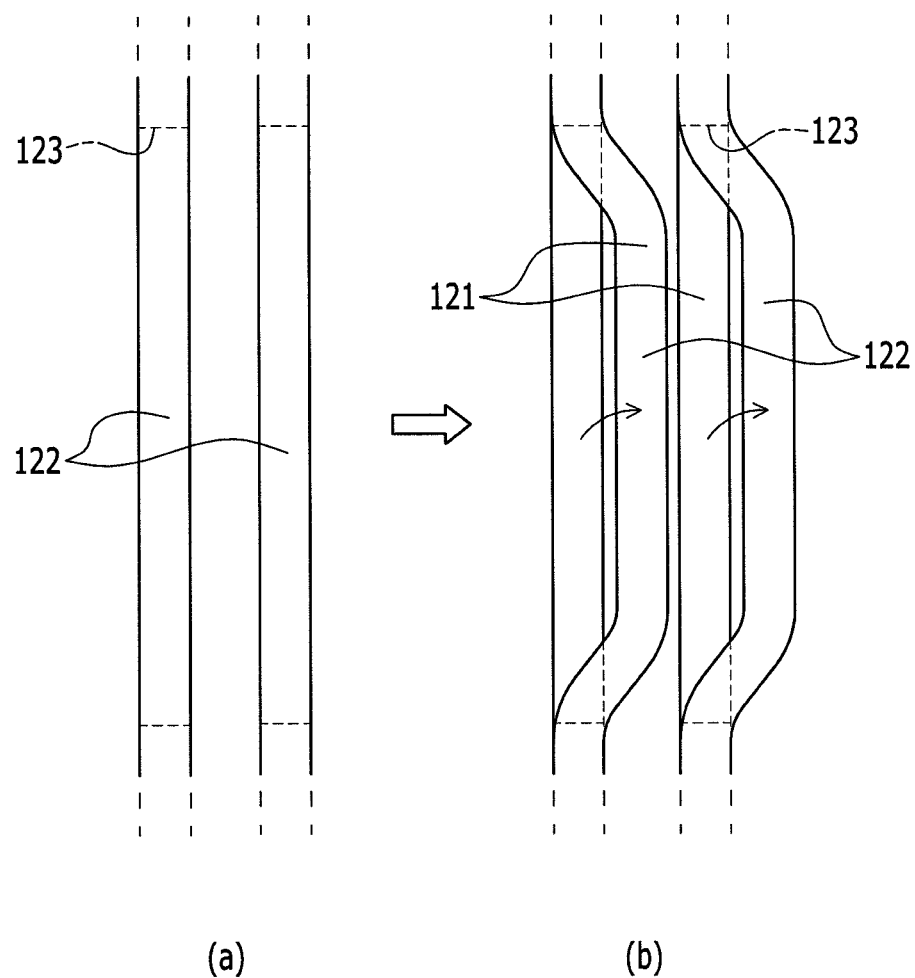
FIG. 5 illustrates a side view showing the lead tab of FIG. 4 before and after intrusion.

FIG. 5 illustrates a side view showing the lead tab of FIG. 4 before and after intrusion. Referring to FIG. 5, the absorption portion 122 and the welding portion 121 keep overlapping each other before deformation (see (a) of FIG. 5). When deformed due to external compression, the absorption portion 122 may be moved to a side of the welding portion 121 and deformed (see (b) of FIG. 5).

Accordingly, even if the absorption portion 122 intrudes into the electrode assembly 10 from a side of the welding portion 121, the absorption portion 122 may be securely moved and deformed along the fourth width W4 of the slot hole 123, and thus intrude as little as possible into the electrode assembly 10. Thus, the possibility of internal short-circuiting of the electrode assembly 10 may be decreased.

A variety of example embodiments will be described below. Repeated description of the same components as shown and described above with respect to the first example embodiment and the above-described example embodiment is omitted, and the different components will be explained.

Figure 6:
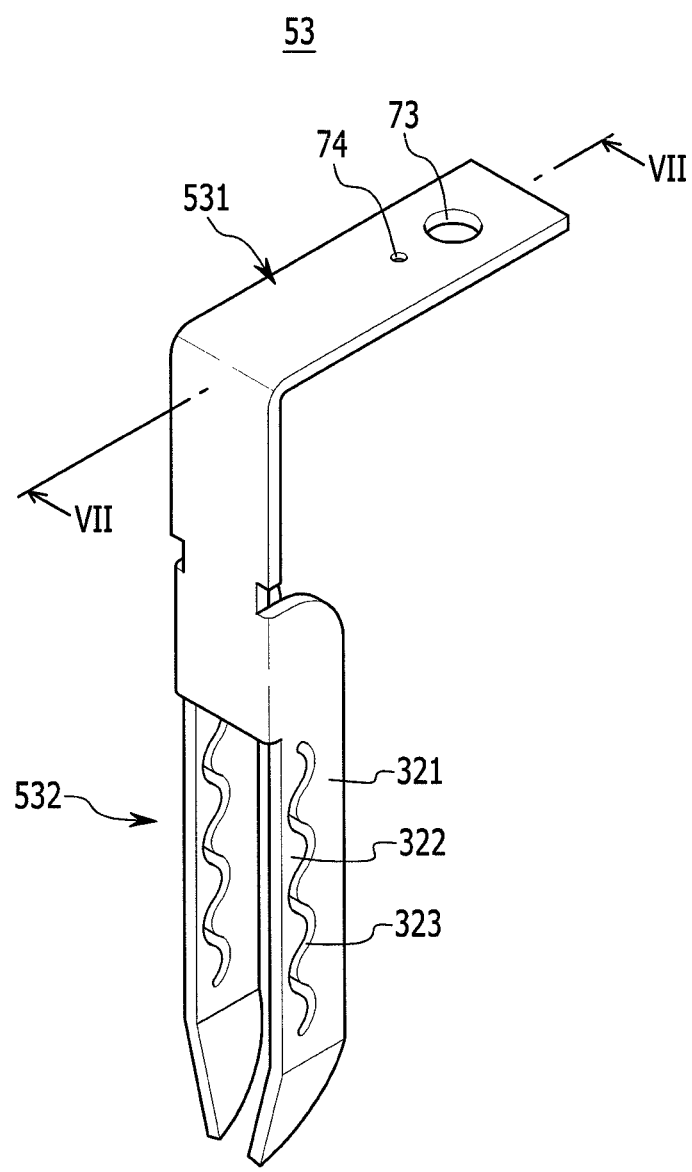
FIG. 6 illustrates a perspective view of a lead tab used in a rechargeable battery in accordance with a second example embodiment.
Figure 7:
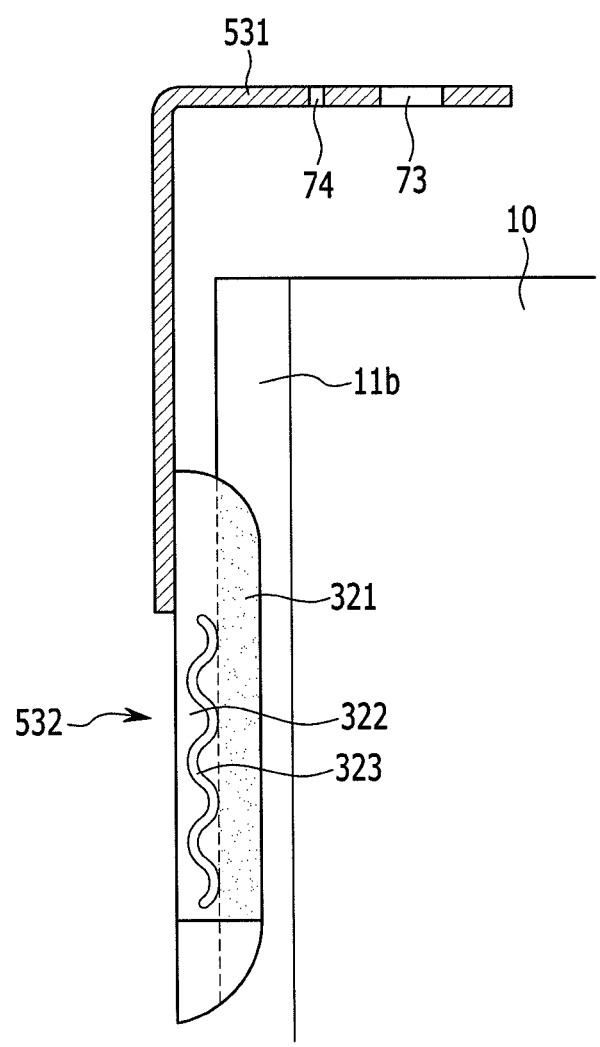
FIG. 7 illustrates a cross-sectional view taken along line VII-VII of FIG. 6.

FIG. 6 illustrates a perspective view of a lead tab used in a rechargeable battery in accordance with a second example embodiment. FIG. 7 illustrates a cross-sectional view taken along line VII-VII of FIG. 6.

Referring to FIG. 6 and FIG. 7, the lead tab 53 includes a terminal connection part 531 connected to the rivet terminal 21a of the electrode terminal 21 and a current-collecting connection part 532 connected to the uncoated region 11b of the negative electrode 11 of the electrode assembly 10.

The current-collecting connection part 532 includes a welding portion 321 to be connected to the electrode assembly 10 and an absorption portion 322 to be separated from the welding portion 321 in a direction intersecting the electrode terminal 21 and provided on the outer side of the welding portion 321.

The welding portion 321 and the absorption portion 322 are disposed at the right and left. Also, the welding portion 321 is disposed close to the negative electrode 11 of the electrode assembly 10, and the absorption portion 322 is disposed at a distance from the negative electrode 11 of the electrode assembly 10, compared to the welding portion 321.

For example, the welding portion 321 may be ultrasonically welded or laser-welded to the uncoated region 11b of the negative electrode 11 of the electrode assembly 10. The absorption portion 322 is spaced apart from the welding portion 321, with a slot hole 323 interposed between them.

The slot hole 323 may be formed along the length of the current-collecting connection part 532. Thus, the welding portion 321 and the absorption portion 322 are spaced apart from each other along the length of the current-collecting connection part 532, being close to and at a distance from the negative electrode 11 of the electrode assembly 10, respectively.

In the present example embodiment, the slot hole 323 is formed in a curved line along the length of the current-collecting connection part 532. Accordingly, the welding portion 321 and the absorption portion 322 are spaced apart from each other along the slot hole 323, being close to and at a distance from the negative electrode 11.

The absorption portion 322 and the welding portion 321 keep overlapping each other before deformation. If deformed due to external compression, the absorption portion 322 may be moved to a side of the welding portion 321 and deformed. In this case, the curved slot hole 323 may easily guide the raised region of the absorption portion 322 to a side of the depressed region of the welding portion 321.

Figure 8:
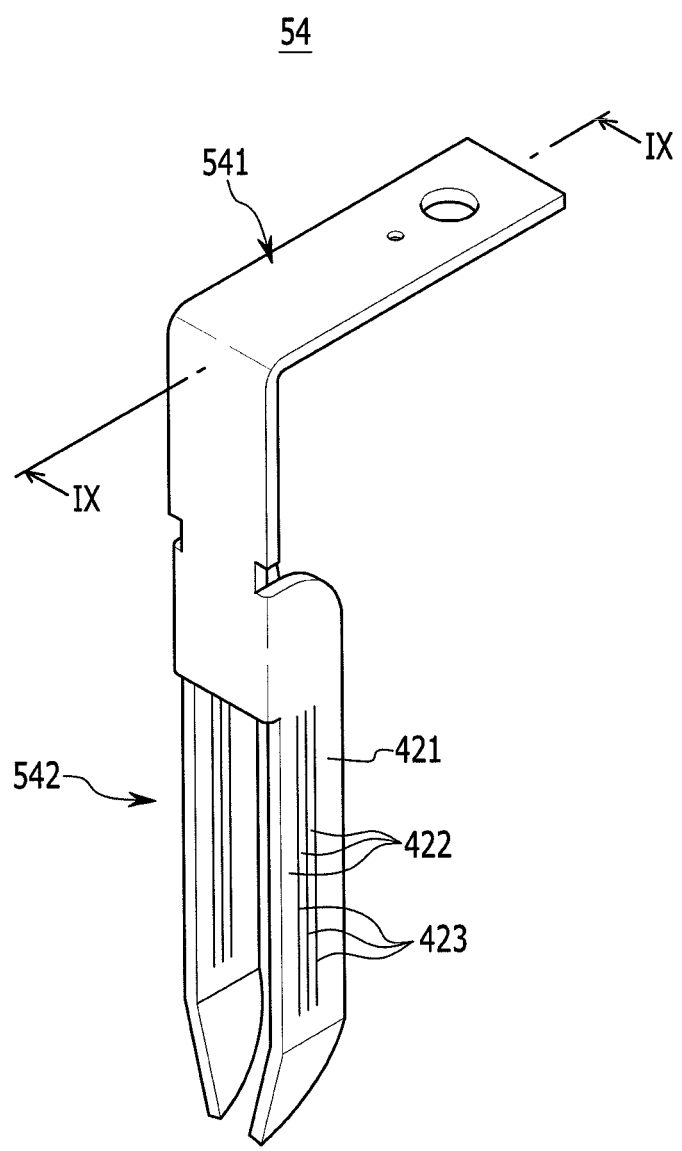
FIG. 8 illustrates a perspective view of a lead tab used in a rechargeable battery in accordance with a third example embodiment.
Figure 9:
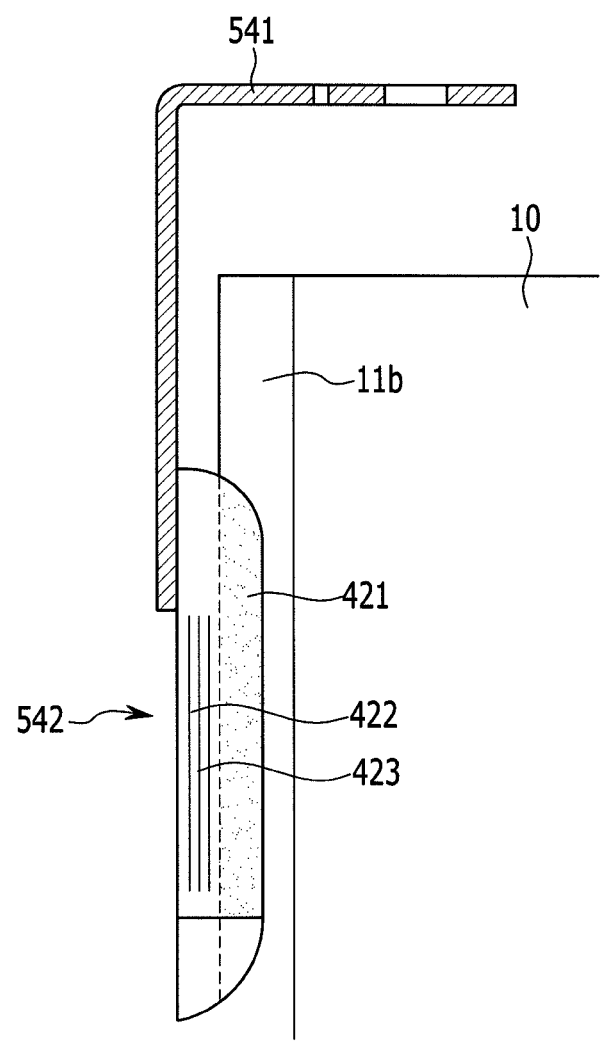
FIG. 9 illustrates a cross-sectional view taken along line IX-IX of FIG. 8.
Figure 10:
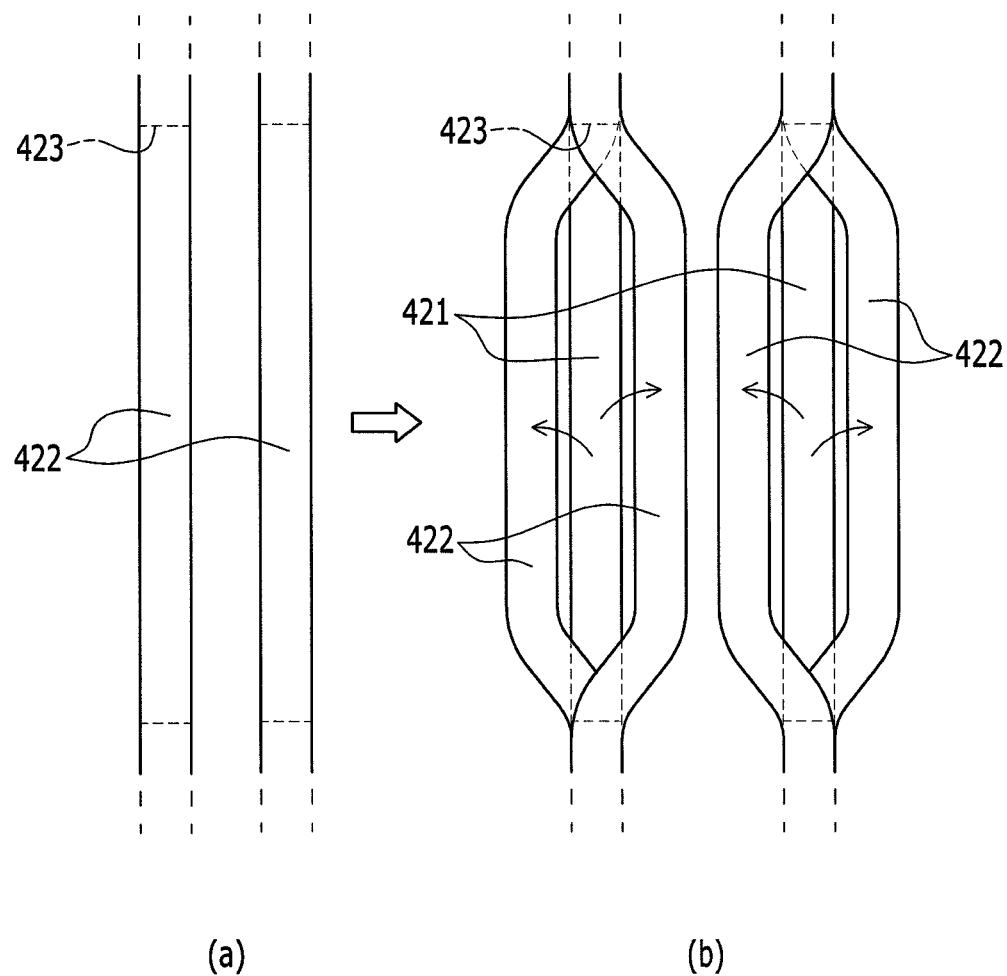
FIG. 10 illustrates a side view showing the lead tab of FIG. 9 before and after intrusion.

FIG. 8 illustrates a perspective view of a lead tab used in a rechargeable battery in accordance with a third example embodiment. FIG. 9 illustrates a cross-sectional view taken along line IX-IX of FIG. 8. FIG. 10 illustrates a side view showing the lead tab of FIG. 9 before and after intrusion.

Referring to FIG. 8 and FIG. 9, the lead tab 54 includes a terminal connection part 541 connected to the rivet terminal 21a of the electrode terminal 21 and a current-collecting connection part 542 connected to the uncoated region 11b of the negative electrode 11 of the electrode assembly 10.

The current-collecting connection part 542 includes a welding portion 421 to be connected to the electrode assembly 10 and an absorption portion 422 to be separated from the welding portion 421 in a direction intersecting the electrode terminal 21 and provided on the outer side of the welding portion 421.

The welding portion 421 is connected to the uncoated region 11b of the negative electrode 11 of the electrode assembly 10 by welding. The absorption portion 422 is separated from the welding portion 421 by a line 423 formed along the length of the current-collecting connection part 542.

The line 423 may be formed current-collecting connection part 542 in a perforated line, e.g., a straight line or continuous cut, along the length of the current-collecting connection part 542, and provided in a plurality of lines parallel to each other. The absorption portion 422 and the welding portion 421 keep overlapping each other before deformation (see (a) of FIG. 10).

When deformed due to external compression, the absorption portion 422 may be moved to a side of the welding portion 421 and deformed. In this case, the straight lines 423 may easily guide a plurality of regions of the absorption portion 422 to both sides of the welding portion 421 (see (b) of FIG. 10).

Accordingly, even when the absorption portion 422 intrudes into the electrode assembly 10 from a side of the welding portion 421, the absorption portion 422 may be separated from the perforated lines 423 and securely moved and deformed, and then intrude much less into the electrode assembly 10. The possibility of internal short-circuiting of the electrode assembly 10 may be further decreased.

By way of summation and review, a rechargeable battery may include an electrode assembly for performing charging and discharging operations, a case accommodating the electrode assembly, a cap plate coupled to an opening of the case, and a lead tab for electrically connecting the electrode assembly to an electrode terminal. The lead tab includes a terminal connection part connected to the electrode terminal and a current-collecting connection part connected to the electrode assembly. The current-collecting connection part is welded to an uncoated region. Accordingly, when the electrode assembly is inserted into the case, the lead tab is disposed on both sides of the inside of the case.

If the outer side of the case corresponding to the electrode assembly and the current-collecting connection part of the lead tab is compressed during the use of the rechargeable battery, the case may intrude on the inside. In this case, the current-collecting connection part of the lead tab may intrude into the electrode assembly and cause internal short-circuiting as it is pushed by the case.

As described above, embodiments relate to a rechargeable battery with a lead tab connecting an electrode assembly to an electrode terminal. Embodiments may provide a rechargeable battery that helps minimize the intrusion of a lead tab into an electrode assembly. Embodiments may provide a rechargeable battery that prevents internal short-circuiting of an electrode assembly by helping to minimize the intrusion of a lead tab into the electrode assembly despite external compression.

According to an example embodiment, the current-collecting connection part has a welding portion to be connected to the electrode assembly and an absorption portion separated from the welding portion. With this configuration, when external compression is transferred to the current-collecting connection part, the absorption portion may be deformed and separated from the welding portion so as to reduce or eliminate intrusion into the electrode assembly. Accordingly, the welding portion may remain welded to the electrode assembly despite of the intrusion of the absorption part. Moreover, the lead tab, on the whole, may intrude little or not into the electrode assembly, which may help prevent internal short-circuiting of the electrode assembly.

DESCRIPTION OF SYMBOLS

| | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21, 22: electrode terminal | 21a, 22a: rivet terminal |
| 21b, 22b: flange | 21c, 22c: plate terminal |
| 21d: protrusion | 24: vent hole |
| 25: vent plate | 25a: notch |
| 31: external insulating member | 36, 37: gasket |
| 46: top plate | 51, 52, 53, 54: lead tab |
| 73, 74: pass-through slot | 100: rechargeable battery |
| 121, 321, 421: welding portion | 122, 322, 422: absorption portion |
| 123, 323: slot hole | 423: perforated line |
| 511, 531, 541: terminal connection part | |
| 512, 532, 542: current-collecting connection part | |
| H1, H2: terminal hole | |
| W1, W2, W3. W4: first, second, third, and fourth widths | |

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
    an electrode assembly for performing charging and discharging operations;
    a case accommodating the electrode assembly;
    a cap plate coupled to an opening of the case;
    an electrode terminal installed on the cap plate; and
    a lead tab connecting the electrode assembly to the electrode terminal, the lead tab including:
    a terminal connection part connected to the electrode terminal; and
    a current-collecting connection part connected to the electrode assembly, the current-collecting connection part including:
    a welding portion connected to a first side of the electrode assembly; and
    an absorption portion separated from the welding portion in a first direction parallel to the cap plate and with a space being provided between the absorption portion and an outer side of the welding portion, the space being disposed at least in part beyond the first side of the electrode assembly, wherein:
    the welding portion is welded to an uncoated region of the first side of the electrode assembly,
    the absorption portion is spaced apart from the welding portion by a slot hole formed along a length of the current-collecting connection part between the absorption portion and the welding portion, and
    the slot hole is formed in a curved line along the length of the current-collecting connection part.

2. The rechargeable battery as claimed in claim 1, wherein the current-collecting connection part has a first width defined in the first direction, the welding portion and the absorption portion have a second width and a third width, respectively, both of which are less than the first width, and the second width is greater than the third width.

3. The rechargeable battery as claimed in claim 1, wherein the welding portion is welded to an uncoated region of the first side of the electrode assembly, and the absorption portion is separated from the welding portion by a continuous cut formed through the current-collecting connection part along a length of the current-collecting connection part.

4. A rechargeable battery, comprising: an electrode assembly for performing charging and discharging operations;

a case accommodating the electrode assembly;

a cap plate coupled to an opening of the case;

an electrode terminal installed on the cap plate; and a lead tab connecting the electrode assembly to the electrode terminal, the lead tab including:

a terminal connection part connected to the electrode terminal; and a current-collecting connection part connected to the electrode assembly, the current-collecting connection part including:

a welding portion connected to a first side of the electrode assembly; and an absorption portion separated from the welding portion in a first direction parallel to the cap plate and with a space being provided between the absorption portion and an outer side of the welding portion, the space being disposed at least in part beyond the first side of the electrode assembly, wherein:

the welding portion is welded to an uncoated region of the first side of the electrode assembly, the absorption portion is separated from the welding portion by a continuous cut formed through the current-collecting connection part along a length of the current-collecting connection part, and the continuous cut is formed in a straight line along the length of the current-collecting connection part, and provided in a plurality of continuous cuts parallel to each other.

5. The rechargeable battery as claimed in claim 1, wherein the slot hole has a width in the first direction, a length orthogonal to the width, and a thickness in a direction orthogonal to the width and penetrating the current-collecting connection part, and the length of the slot hole is greater than the width of the slot hole.

6. The rechargeable battery as claimed in claim 1, wherein the absorption portion is deformable along the space and such that the absorption portion can move relative to the welding portion when deformed.

* * * * *